(12) United States Patent
Miyoshi et al.

(10) Patent No.: US 6,993,308 B2
(45) Date of Patent: Jan. 31, 2006

(54) RADIO RECEIVING DEVICE AND RADIO RECEIVING METHOD

(75) Inventors: Kenichi Miyoshi, Yokohama (JP); Mitsuru Uesugi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 509 days.

(21) Appl. No.: 10/088,053

(22) PCT Filed: Jul. 25, 2001

(86) PCT No.: PCT/JP01/06394

§ 371 (c)(1), (2), (4) Date: Mar. 14, 2002

(87) PCT Pub. No.: WO02/09317

PCT Pub. Date: Jan. 31, 2002

(65) Prior Publication Data

US 2002/0164967 A1    Nov. 7, 2002

(30) Foreign Application Priority Data

Jul. 26, 2000    (JP) .............................. 2000-225161

(51) Int. Cl.
*H04B 7/00* (2006.01)

(52) U.S. Cl. ................................ 455/277.1; 455/67.11; 455/67.14; 375/324; 375/340

(58) Field of Classification Search ............ 455/277.1, 455/95, 575, 561, 288, 334, 277.2, 296, 313, 455/323, 550.1, 115.1, 115.2, 130, 135, 136, 455/140, 192.1, 226.3, 67.11, 67.13, 67.14; 375/147, 148, 226, 261, 284, 285, 324, 340, 375/346

See application file for complete search history.

(56) References Cited

U.S. PATENT DOCUMENTS

| 5,436,928 A    | 7/1995  | Fukuawa et al. |
| 5,579,344 A    | 11/1996 | Namekata |
| 6,049,535 A *  | 4/2000  | Ozukturk et al. ........... 370/335 |
| 6,157,619 A *  | 12/2000 | Ozluturk et al. ............ 370/252 |
| 6,157,811 A *  | 12/2000 | Dent .......................... 455/12.1 |
| 6,212,174 B1 * | 4/2001  | Lomp et al. ................. 370/335 |
| 6,717,976 B1 * | 4/2004  | Shen .......................... 375/147 |
| 6,748,024 B2 * | 6/2004  | Kuchi et al. ................. 375/299 |
| 6,826,240 B1 * | 11/2004 | Thomas et al. ............. 375/340 |

FOREIGN PATENT DOCUMENTS

CN    1218337 A    6/1999

(Continued)

OTHER PUBLICATIONS

International Search Report dated Nov. 6, 2001.

(Continued)

*Primary Examiner*—Edward F. Urban
*Assistant Examiner*—Thuan Nguyen
(74) *Attorney, Agent, or Firm*—Stevens, Davis, Miller & Mosher, LLP

(57) ABSTRACT

A likelihood calculating section 205 calculates a likelihood of a data portion signal and outputs a weighting coefficient according to the likelihood to a multiplier 206. The multiplier 206 multiplies a data channel estimation value output from a data channel estimating section 204 by the weighting coefficient output from the likelihood calculating section 205, whereby weighting the data channel estimation value according to likelihood of the data portion signal. A combining section 207 combines a PL channel estimation value with the data channel estimation value weighted according to the likelihood of data portion signal to obtain a final channel estimation value.

6 Claims, 6 Drawing Sheets

FOREIGN PATENT DOCUMENTS

| | | |
|---|---|---|
| EP | 0887975 A2 | 12/1998 |
| EP | 0896440 A2 | 2/1999 |
| JP | 05316083 | 11/1993 |
| JP | 06334692 | 12/1994 |
| JP | 06338914 | 12/1994 |
| JP | 07058672 | 3/1995 |
| JP | 07095107 | 4/1995 |
| JP | 08037479 | 2/1996 |
| JP | 10173573 | 6/1998 |
| JP | 11055166 | 2/1999 |
| JP | 11502098 | 2/1999 |
| JP | 11205198 | 7/1999 |
| JP | 11355849 | 12/1999 |
| KR | 1999 007213 | 1/1999 |

OTHER PUBLICATIONS

Japanese Office Action dated Jun. 15, 2004 with English translation.

Korean Office Action dated Jun. 23, 2004 with English translation.

* cited by examiner

RADIO RECEIVING DEVICE AND RADIO RECEIVING METHOD

TECHNICAL FIELD

The present invention relates to a radio receiving apparatus and a radio receiving method.

BACKGROUND ART

In digital radio communications, channel estimation is performed to compensate for channel variations of a received signal to be demodulated correctly.

In order to improve the accuracy of channel estimation, Japanese laid-open patent publication No. HEI 11-355849 describes a method in which channel estimation is performed using not only a known signal of a pilot portion but also a temporary decision value of an unknown signal of a data portion.

However, in the above-mentioned conventional radio receiving method, in spite of the purpose of improving accuracy of the channel estimation, if an error occurs in the temporary decision value of data portion signal due to an influence of fading etc., there is a problem in which accuracy of the channel estimation is deteriorated conversely.

DISCLOSURE OF INVENTION

An object of the present invention is to provide a radio receiving apparatus and a radio receiving method for preventing the accuracy of channel estimation from being deteriorated and to perform channel estimation with high accuracy when channel estimation is performed using an unknown signal of data portion.

The inventors of this invention paid attention to reliability of a temporary decision value and found out that an error occurred in the temporary decision value when reliability of the temporary decision value is relatively low, and therefore, they proposed the present invention.

Here, in order to achieve the above object, the present invention prevents accuracy of channel estimation from being deteriorated and performs channel estimation with high accuracy when channel estimation is performed using an unknown signal of data portion by appropriately controlling the channel estimation value based on reliability of the temporary decision value.

BEST MODE FOR CARRYING OUT THE INVENTION

With reference now to the attached drawings, hereafter, embodiments of the present invention will be specifically explained. In the explanation given below, it is assumed that channel variation includes phase rotation and amplitude variation. In addition, it is assumed that channel estimation includes estimation of phase rotation and that of amplitude variation, and that a channel estimation value includes an amount of phase rotation and an amount of amplitude variation.

(Embodiment 1)

In radio receiving apparatus and radio receiving method according to this embodiment, a channel estimation value obtained from a signal of data portion is weighted in accordance with the level of reliability (i.e., likelihood) of the signal of data portion.

Figure 1:
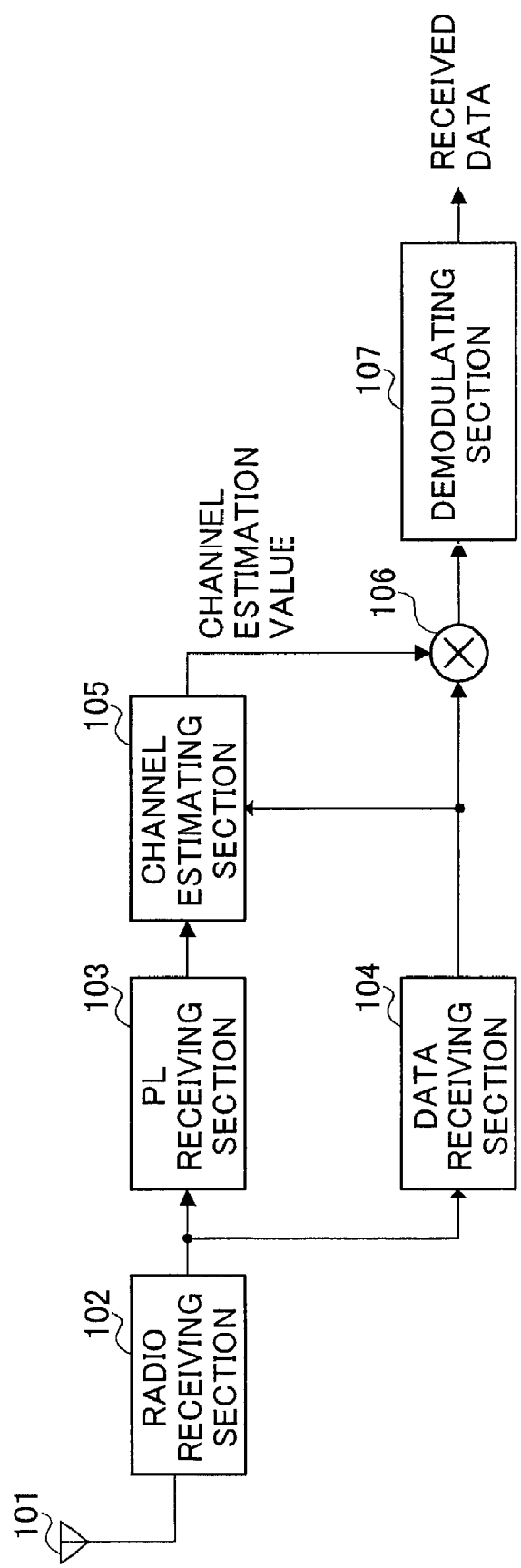
FIG. 1 is a block diagram showing a schematic configuration of a principal part of the radio receiving apparatus according to Embodiment 1 of the present invention.

FIG. 1 is a block diagram showing a schematic configuration of the principal part of radio receiving apparatus according to Embodiment 1 of the present invention. In the radio receiving apparatus shown in FIG. 1, a radio receiving section 102 provides predetermined radio processing such as down convert, A/D conversion, etc., to signals received through an antenna 101 and outputs the resultant to both PL (pilot) receiving section 103 and data receiving section 104.

The PL receiving section 103 performs despread processing by multiplying the received signals by a spreading code that spreads a known signal of a pilot portion of the received signal (hereinafter referred to as "pilot portion signal"), whereby extracting the pilot portion signal from the received signals and outputs the resultant to a channel estimating section 105.

The channel estimating section 105 outputs a channel estimation value, which has been weighted in accordance with the level of reliability (i.e., likelihood) of the data portion signal to a multiplier 106. It should be noted that the configuration of channel estimating section 105 would be described later.

The multiplier 106 complex multiplies the data portion signal by the channel estimation value output from channel estimating section 105. Thus, the data portion signal is compensated for channel variation. A demodulating section 107 provides predetermined demodulation processing to the data portion signal subjected to compensation for channel variation. Therefore, a received data is obtained.

Figure 2:
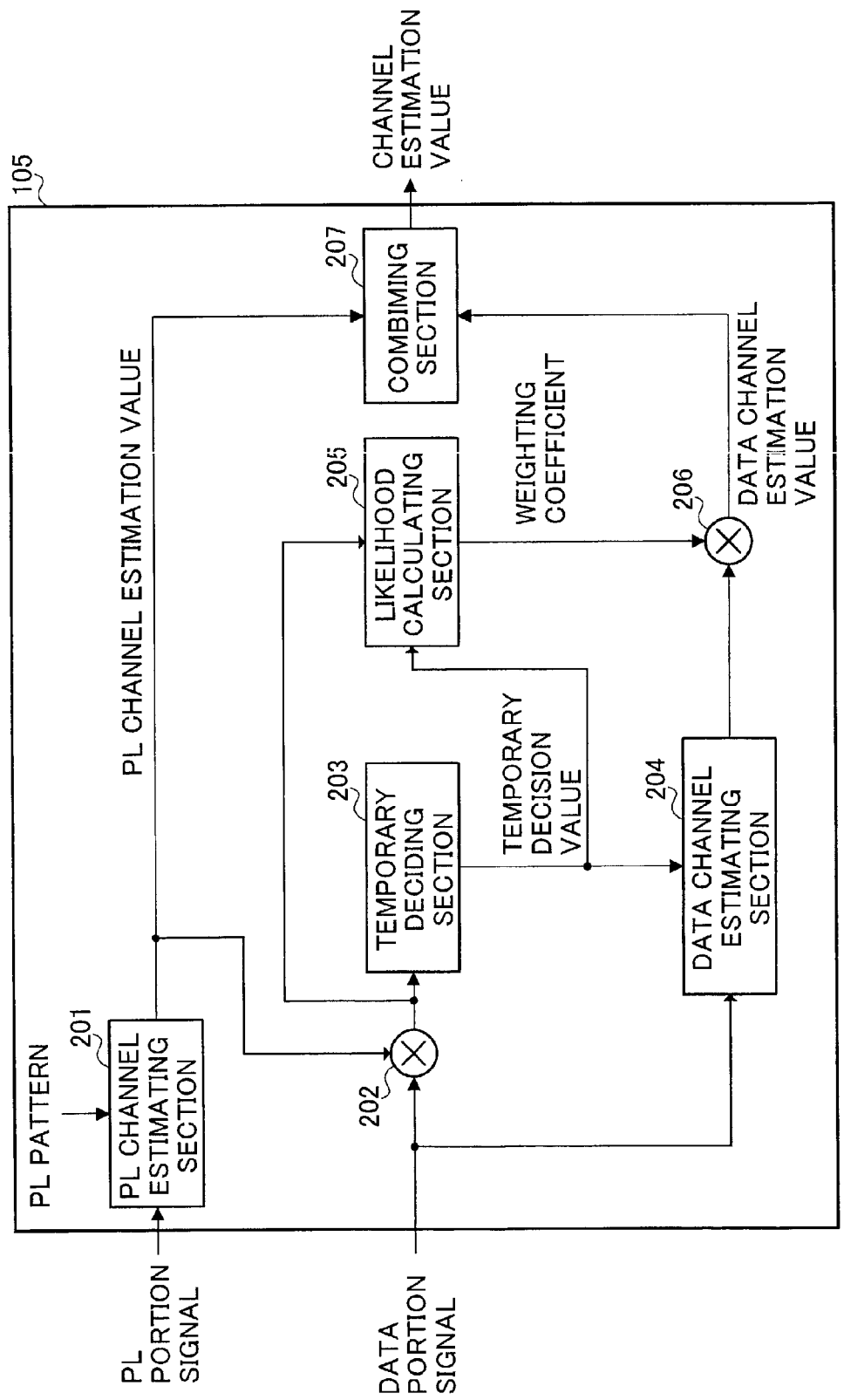
FIG. 2 is a block diagram showing a schematic configuration of a principal part of channel estimating section of the radio receiving apparatus according to Embodiment 1 of the present invention.

Next, the configuration of channel estimating section 105 will be explained. FIG. 2 is a block diagram showing a schematic configuration of the principal part of the channel estimating section of the radio receiving apparatus according to Embodiment 1 of the present invention. In the channel estimating section 105 shown in FIG. 2, a PL (pilot) channel estimating section 201 performs channel estimation by comparing a known PL (pilot) pattern with a PL (pilot) portion signal output from the PL receiving signal 103 to calculate a channel estimation value. Then, the PL channel estimating section 201 outputs the calculated channel estimation value to both multiplier 202 and combining section 207. In addition, the channel estimation value calculated by the PL channel estimating section 201 using the pilot portion is hereinafter referred to as "PL channel estimation value."

The multiplier 202 complex multiplies the data portion signal output from the data receiving section 104 by the PL channel estimation value. Then, the multiplier 202 outputs the data portion signal subjected to compensation for channel variation using the PL channel estimation value to a temporary deciding section 203.

The temporary deciding section 203 temporarily decides the data portion signal subjected to compensation for channel variation and outputs the temporary decision value to a data channel estimating section 204 and a likelihood calculating section 205.

The data channel estimating section 204 performs channel estimation by comparing the temporary decision value with the data portion signal output from the data receiving section 104 to calculate a channel estimation value. Then, the data channel estimating section 204 outputs the calculated channel estimation value to a multiplier 206. In addition, the channel estimation value calculated by the channel estimating section 204 using the data portion is hereinafter referred to as "data channel estimation value".

The likelihood calculating section 205 calculates likelihood of the temporary decision value of data portion signal and outputs a weighting coefficient according to the likelihood to the multiplier 206. The multiplier 206 multiplies the data channel estimation value output from the data channel estimating section 204 by the weighting coefficient output from the likelihood calculating section 205, whereby weighting the data channel estimation value according to the likelihood of data portion signal.

A combining section 207 combines the PL channel estimation value and the data channel estimation value weighted according to the likelihood of data portion signal to obtain a final channel estimation value and outputs the final channel estimation value to the multiplier 106.

Next, an operational explanation of the radio receiving apparatus according to this embodiment will be given below.

The PL channel estimating section 201 compares the known PL (pilot) pattern with the PL (pilot) portion signal output from the PL receiving section 103 to calculate a PL channel estimation value for each symbol and outputs the calculated PL channel estimation value to the multiplier 202. Moreover, the PL channel estimation value is also output to the combining section 207 to be combined together with the weighted data channel estimation value in a way to be described later by the combining section 207.

The multiplier 202 complex multiplies the data portion signal output from the data receiving section 104 by the PL channel estimation value and outputs the data portion signal subjected to compensation for channel variation by the PL channel estimation value to the temporary decision section 203 and likelihood calculating section 205. The temporary decision section 203 temporarily decides the data portion signal subjected to channel variation and outputs the temporary decision value to the data channel estimating section 204 and likelihood calculating section 205. In other words, pre-temporary decision of the data portion signal and post-temporary decision of the data portion signal are input to the likelihood calculating section 205.

The likelihood calculating section 205 calculates the likelihood of temporary decision value of data portion signal for each symbol from the signal points of pre-temporary decision and post-temporary decision.

Next, an explanation of the calculation of likelihood to be performed by the likelihood calculating section 205 will be given.

Since the calculation of likelihood using the likelihood calculating section 205 depends on the modulation technique that the communication partner uses, the following will explain two different cases in which the communication partner uses QPSK modulation and BPSK modulation.

Figure 3:
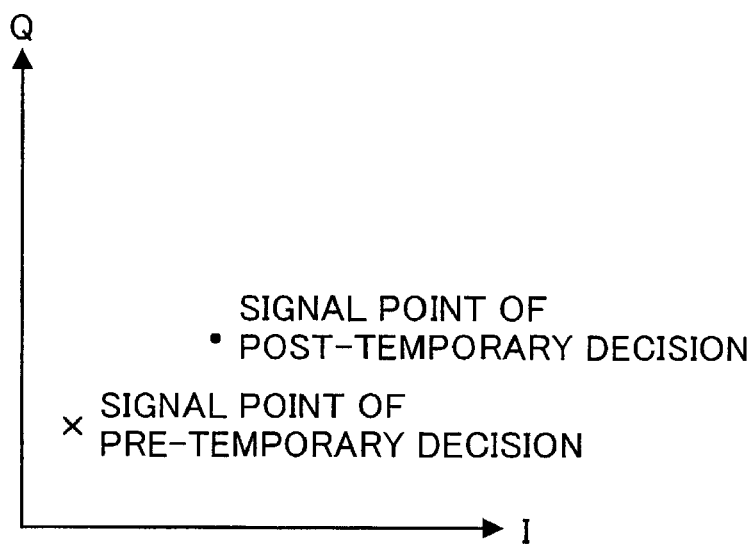
FIG. 3 is an exemplary graph illustrating a calculation of likelihood to be carried out by a likelihood calculating section of the radio receiving apparatus according to Embodiment 1 of the present invention in the case where a communication partner uses QPSK modulation.

First, the case in which the communication partner uses QPSK modulation will be explained with reference to FIG. 3. FIG. 3 is an exemplary graph illustrating a calculation of likelihood to be carried out by a likelihood calculating section of the radio receiving apparatus according to Embodiment 1 of the present invention in the case where a communication partner uses QPSK modulation. In FIG. 3, a horizontal axis (I axis) represents an in-phase component of data portion signal, and a vertical axis (Q axis) represents a quadrature phase component of data portion signal.

As illustrated in FIG. 3, the lower the likelihood in QPSK case is the smaller the signal point allocated to the I component and Q component before temporarily deciding the data portion signal (namely, "signal point of pre-temporary decision in FIG. 3). In addition, the further the Euclidean distance calculated between the allocated signal point of the signal after temporarily deciding the data portion signal (namely, "signal point of post-temporary decision in FIG. 3) and the allocated signal point of pre-temporary decision is the lower the likelihood. Calculation of likelihood is similarly performed in the second quadrant, the third quadrant, and the fourth quadrant.

Figure 4:
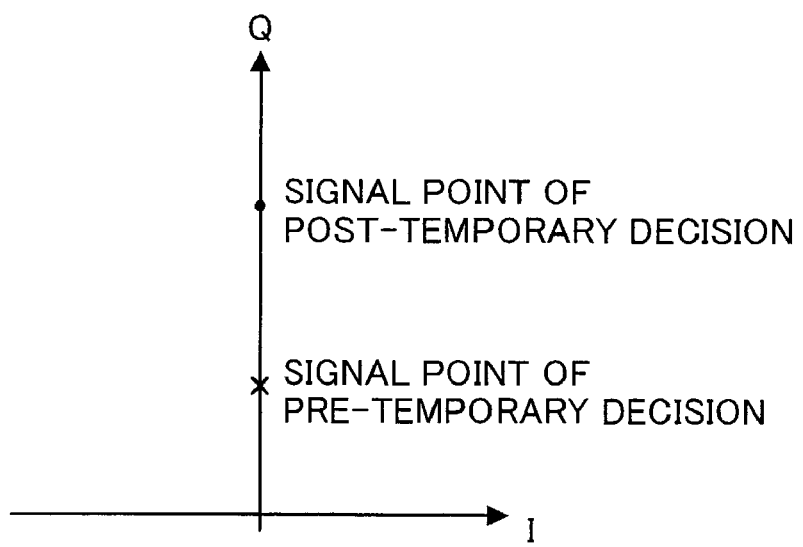
FIG. 4 is an exemplary graph illustrating a calculation of likelihood to be carried out by the likelihood calculating section of the radio receiving apparatus according to Embodiment 1 of the present invention in the case where a communication partner uses BPSK modulation.

Next, an explanation of the case where the communication partner uses BPSK modulation will be given with reference to FIG. 4. FIG. 4 is an exemplary graph illustrating a calculation of likelihood to be carried out by the likelihood calculating section of the radio receiving apparatus according to Embodiment 1 of the present invention in the case where a communication partner uses BPSK modulation. As illustrated in FIG. 4, the lower the likelihood using BPSK is the smaller the signal point allocated to the Q component of the pre-temporary decision.

In this way, the likelihood calculating section 205 calculates likelihood of the temporary decision value for each symbol of the data portion signal. Then, the likelihood calculating section 205 calculates a weighting coefficient α according to the calculated likelihood for each symbol. This weighting coefficient α is a coefficient that becomes larger as the likelihood of temporary decision value of data portion signal becomes higher and becomes smaller as the likelihood of temporary decision value of data portion signal becomes lower. The calculated weighting coefficient α is output to the multiplier 206.

The multiplier 206 multiplies the data channel estimation value of each symbol output from the data channel estimating section by weighting coefficient α of each symbol output from the likelihood calculating section 205. The higher the likelihood of data portion signal is the larger the data channel estimation value; and the lower the likelihood of data portion signal is the smaller the data channel estimation value. In other words, the higher the reliability of data channel estimation value is the larger the value; and the lower the reliability of data channel estimation value is the smaller the value.

The combining section 207 combines the data channel estimation value multiplied by weighting coefficient α and the PL channel estimation value and obtains a final channel estimation value.

In this way, according to the radio receiving apparatus and radio receiving method of this embodiment, the channel estimation value obtained from the signal of data portion is weighted based on the level of reliability (i.e., likelihood) of the signal of data portion. Therefore, the higher the reliability of data portion signal is the larger the data channel estimation value; and the lower the reliability of data portion signal is the smaller the data channel estimation value. Accordingly, it is possible to reduce the degree of influence, which the channel estimation value with low reliability exerts upon the result of channel estimation, and this makes it possible to prevent accuracy of the channel estimation from being deteriorated when the channel estimation is performed using the unknown signal of data portion.

(Embodiment 2)

In the radio receiving apparatus and radio receiving method of this embodiment, likelihood of the signal of data portion is compared with a predetermined threshold value to decide the level of likelihood. Then, a symbol with low likelihood is decided as one having low reliability, and channel estimation is performed without using a channel estimation value obtained from the symbol having low reliability.

The schematic configuration of radio receiving apparatus of this embodiment is the same as that of FIG. 1, and only the internal configuration of channel estimating section is different from that of FIG. 1, so that the explanation of the configuration of radio receiving apparatus is herein omitted and only the channel estimating section is explained.

Figure 5:
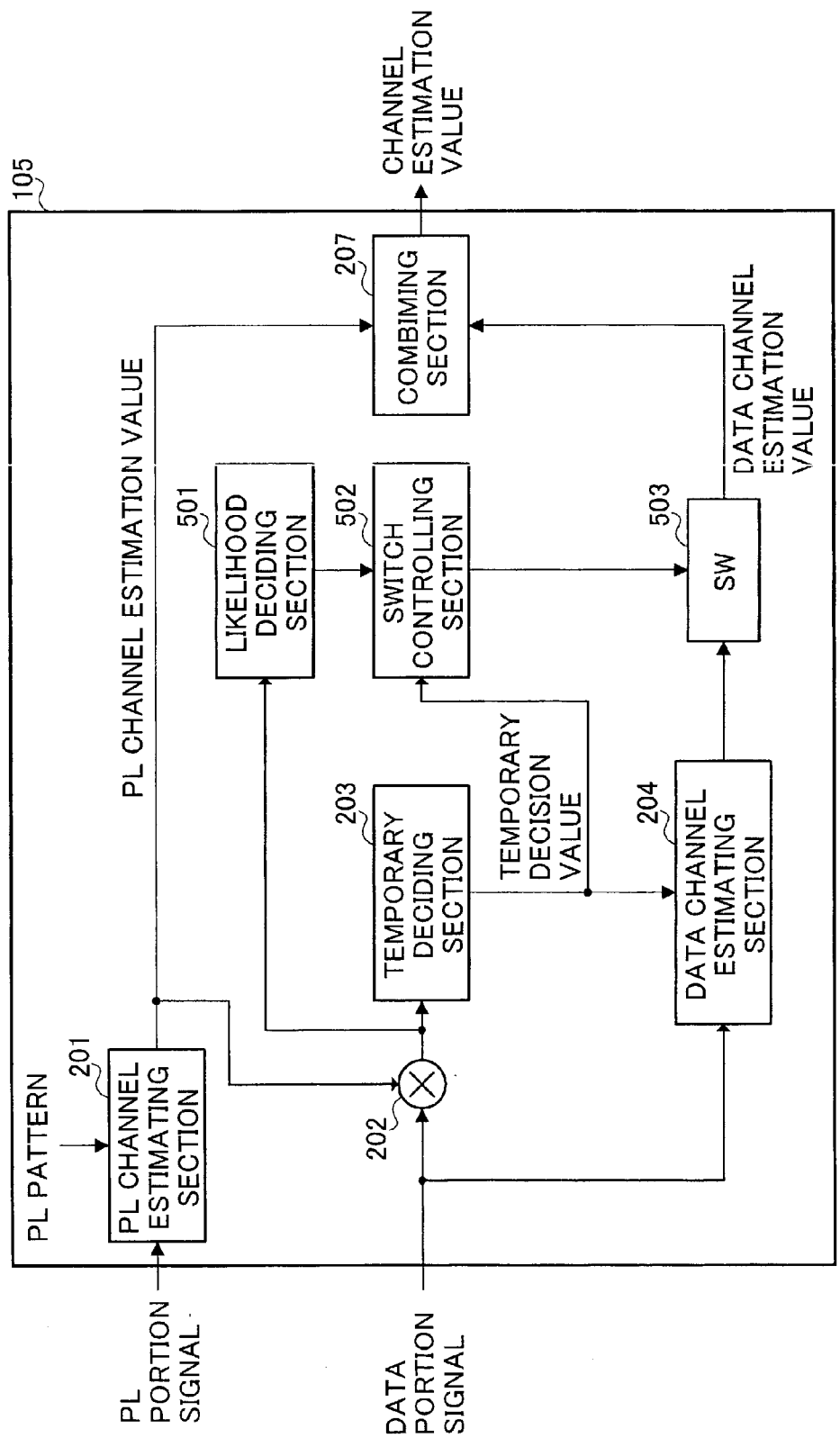
FIG. 5 is a block diagram showing a schematic configuration of a principal part of channel estimating section of the radio receiving apparatus according to Embodiment 2 of the present invention.

FIG. 5 is a block diagram showing a schematic configuration of the principal part of the channel estimating section of the radio receiving apparatus according to Embodiment 2 of the present invention. As shown in the figure, the channel estimating section 105 of the radio receiving apparatus of this embodiment comprises a likelihood deciding section 501, a switch controlling section 502, and a SW (switch) 503 instead of the likelihood calculating section 205 and multiplier 206 shown in FIG. 2. In addition, the same reference numerals as those of FIG. 2 are assigned to the sections common to those of FIG. 2, and specific explanation thereof is omitted.

The likelihood deciding section 501 compares likelihood of the data portion signal with a predetermined threshold value of likelihood to decide the level of likelihood of temporary decision value and outputs a signal indicating the decision result to the switch controlling section 502.

The switching controlling section 502 performs connection/disconnection control of SW 503 in accordance with the decision result. More specifically, when the likelihood of temporary decision value of data portion signal is high, the switching controlling section 502 establishes a connection between the data channel estimating section 204 and combining section 207, therefore, outputs a data channel estimation value to the combining section 207. While, when the likelihood of temporary decision value of data portion signal is low, the switching controlling section 502 disconnects the data channel estimating section 204 and combining section 207, therefore, does not output a data channel estimation value to the combining section 207.

Next, an operational explanation of the radio receiving apparatus of this embodiment will be given.

The likelihood deciding section 501 calculates likelihood of the temporary decision value of data portion signal from the signal points of pre-temporary decision and post-temporary decision of data portion signal for each symbol, and compares the calculated likelihood with the predetermined threshold, whereby deciding the level of likelihood of the temporary decision value of data portion signal.

Here, an explanation of the decision of likelihood to be carried out by the likelihood deciding section 501 will be given.

Since the decision of likelihood using the likelihood deciding section 501 depends on the modulation system that the communication partner uses, the following will explain two cases in which the communication partner uses QPSK modulation and BPSK modulation.

Figure 6:
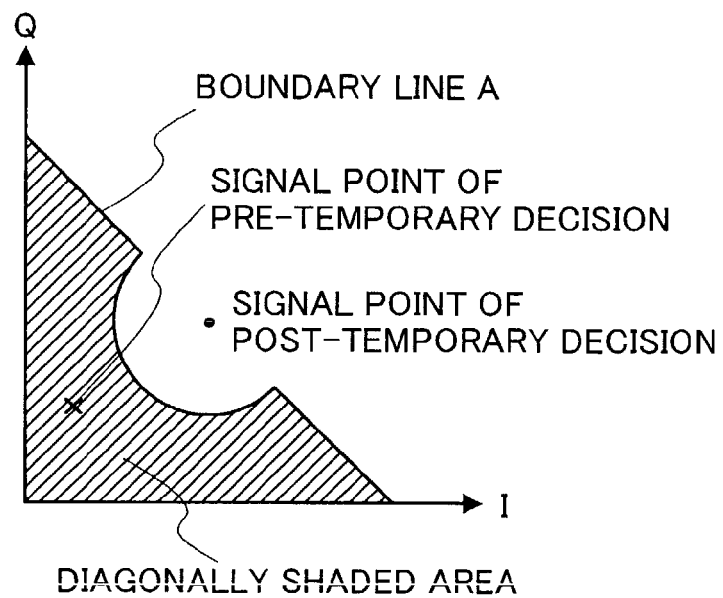
FIG. 6 is an exemplary graph illustrating a decision of likelihood to be carried out by a likelihood deciding section of the radio receiving apparatus according to Embodiment 2 of the present invention in the case where a communication partner uses QPSK modulation.

First, the case in which the communication partner uses QPSK modulation will be explained with reference to FIG. 6. FIG. 6 is an exemplary graph illustrating a decision of likelihood to be carried out by a likelihood deciding section of the radio receiving apparatus according to Embodiment 2 of the present invention in the case where a communication partner uses QPSK modulation. In FIG. 6, a horizontal axis (I axis) represents an in-phase component of data portion signal, and a vertical axis (Q axis) represents a quadrature phase component of data portion signal.

A diagonally shaded area α shown in FIG. 6 is an area that is decided as a low likelihood area. The smaller the signal point of pre-temporary decision allocated to I component and Q component in QPSK case is the lower the likelihood. In addition, the further the Euclidean distance between the signal point of post-temporary decision and signal point of pre-temporary decision is the lower the likelihood. Moreover, the diagonally shaded area is bounded by a boundary line A illustrated in FIG. 6. When the communication partner uses QPSK modulation, the boundary line A corresponds to the threshold value set by the likelihood deciding section 501. Additionally, in second to fourth quadrants, the same diagonally shaded area as that of the first quadrant is set, and decision of likelihood is provided thereto similar to the first quadrant.

Then, the likelihood deciding section 501 decides whether the signal point of pre-temporary decision belongs to the diagonally shaded area α to take a decision on the level of likelihood of the temporary decision value of data portion signal. That is to say, when the signal point of pre-temporary decision does not belong to the diagonally shaded area α, the likelihood deciding section 501 decides that the likelihood of temporary decision value of data portion signal is high and outputs a decision signal to the switch controlling section 502. While, when the signal point of pre-temporary decision belongs to the diagonally shaded area α, the likelihood deciding section 501 decides that the likelihood of temporary decision value of data portion signal is low and outputs a decision signal to the switch controlling section 502.

Figure 7:
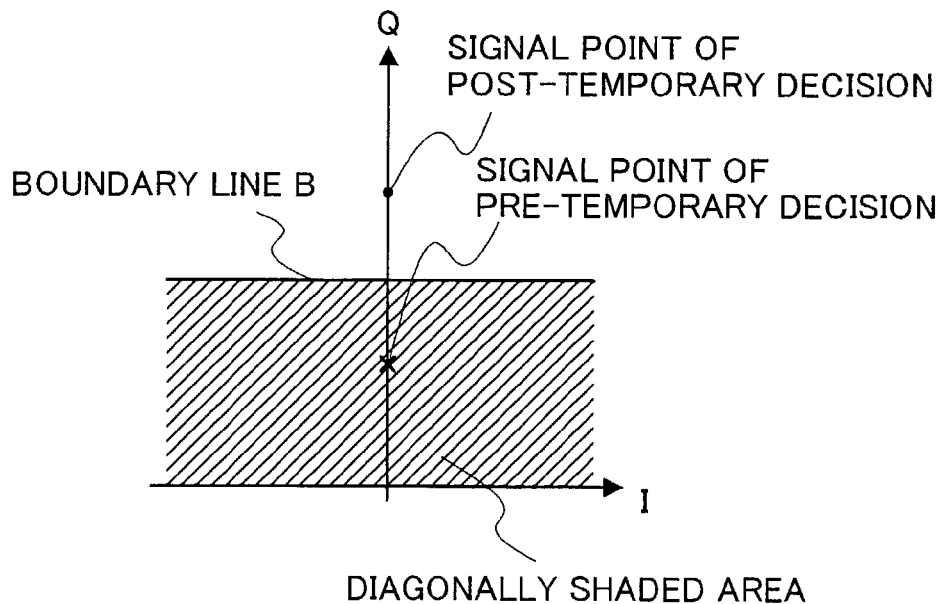
FIG. 7 is an exemplary graph illustrating a decision of likelihood is to be carried out by the likelihood deciding section of the radio receiving apparatus according to Embodiment 1 of the present invention in the case where a communication partner uses BPSK modulation.

Next, the case in which the communication partner uses BPSK modulation will be explained with reference to FIG. 7. FIG. 7 is an exemplary graph illustrating a decision of likelihood is to be carried out by the likelihood deciding section of the radio receiving apparatus according to Embodiment 1 of the present invention in the case where a communication partner uses BPSK modulation.

The smaller the signal point of pre-temporary decision allocated to Q component in BPSK case is the lower the likelihood. Accordingly, an area with a small absolute value of Q component is set as a diagonally shaded area α bounded by a boundary line B. When the communication partner uses BPSK modulation, the boundary line B corresponds to the threshold value set by the likelihood deciding section 501.

Similar to the case in which the communication partner uses QPSK modulation, the likelihood deciding section 501 decides the level of likelihood of temporary decision value of the data portion signal and outputs a decision result indicating decision signal to the switch controlling section 502.

The switch controlling section 502 performs connection/disconnection control of SW 503 according to the decision signal output from the likelihood decision section 501. That is to say, when the likelihood of temporary decision value of data portion signal is high, the connection between data channel estimating section 204 and combining section 207 is established by SW 503. While, when the likelihood of temporary decision value of data portion signal is low, data channel estimating section 204 and combining section 207 are disconnected by SW 503. By such operations of the likelihood deciding section 501, switch controlling section 502 and SW 503, only data channel estimation value with high reliability obtained from high reliability data portion signal is selected among the data channel estimation values calculated on a symbol-by-symbol basis, and the resultant is output to the combining section 207. In other words, among the data channel estimation values calculated on a symbol-by-symbol basis, the data channel estimation values with low reliability are thinned out.

Accordingly, in the combining section 207, the data channel estimation values with low reliability are not considered in calculating the final channel estimation value that is used for compensating the channel variation in received data, and only data channel estimation value with high reliability is combined together with the PL channel estimation value so as to obtain a final channel estimation value. This makes it possible to prevent accuracy of the channel estimation from being deteriorated.

Therefore, in the radio receiving apparatus and radio receiving method according to this embodiment, the likelihood of data portion signal is compared with the predetermined threshold value to decide the level of likelihood, the symbol with low likelihood is decided as the value with low reliability. Then, the channel estimation is carried out without using the channel estimation value obtained from the symbol with low reliability, making it possible to prevent accuracy of the channel estimation from being deteriorated when the channel estimation is performed using the unknown signal of data portion.

(Embodiment 3)

In the radio receiving apparatus and radio receiving method according to this embodiment, a value, which is not yet subjected to error correction, is compared with a value subjected to error correction, and a symbol having a different value is decided as a symbol with low reliability. Then, channel estimation is performed without using the channel estimation value obtained from the symbol with low reliability.

The schematic configuration of radio receiving apparatus of this embodiment is the same as that of FIG. 1, and only the internal configuration of channel estimating section is different from that of FIG. 1, so that the explanation of the configuration of radio receiving apparatus is herein omitted and only the channel estimating section is explained.

Figure 8:
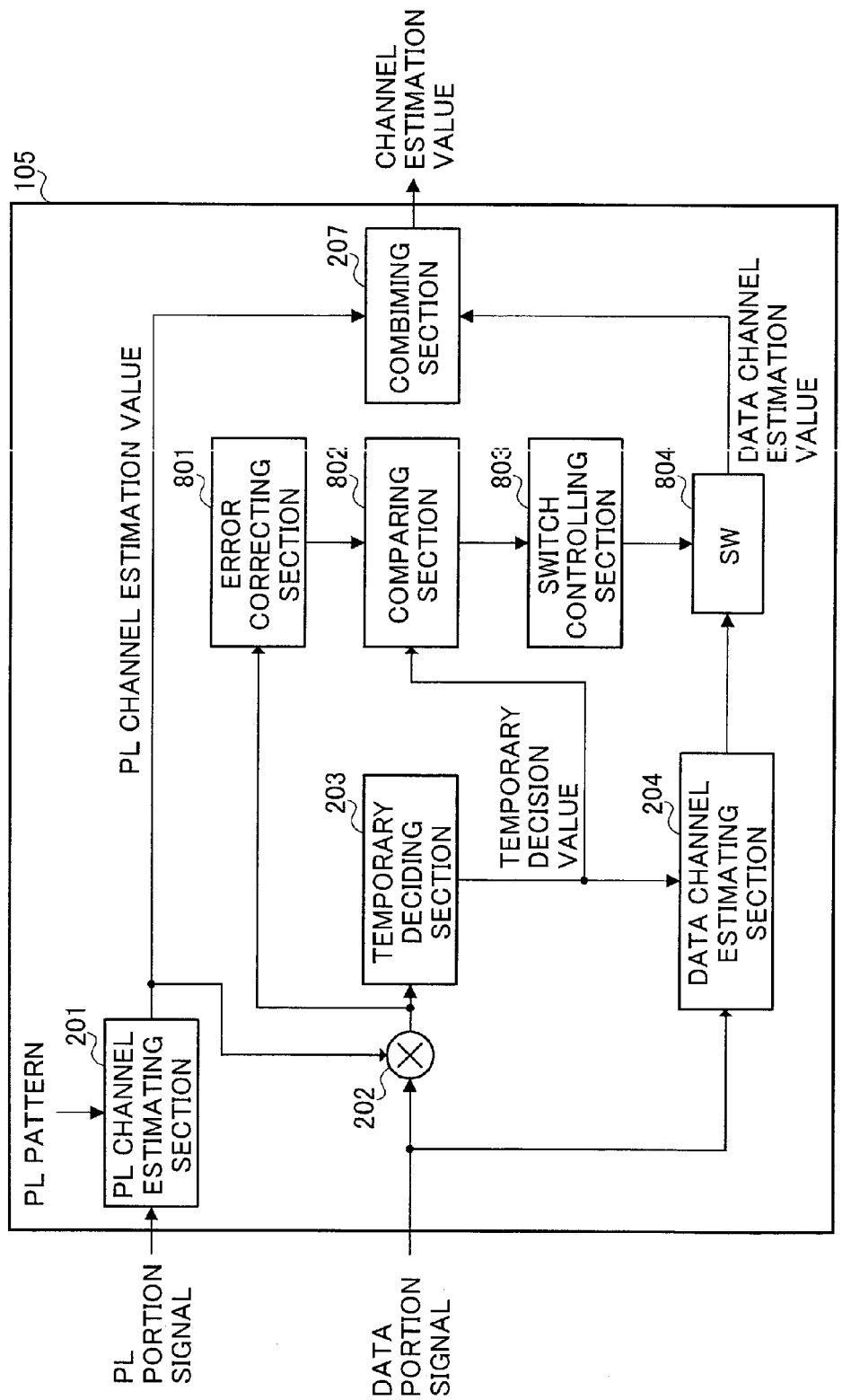
FIG. 8 is a block diagram showing a schematic configuration of a principal part of channel estimating section of the radio receiving apparatus according to Embodiment 3 of the present invention.

FIG. 8 is a block diagram showing a schematic diagram of the principal part of the channel estimating section of the radio receiving apparatus according to Embodiment 3. As shown in the figure, the channel estimating section 105 of the radio receiving apparatus of this embodiment comprises an error correcting section 801, comparing section 802, switch controlling section 803, and SW (switch) 804 instead of the likelihood deciding section 501, switch controlling section 502 and SW 503 shown in FIG. 5. Additionally, in FIG. 8, the same reference numerals as those of FIG. 5 are assigned to the sections common to those of FIG. 5, and specific explanation thereof is omitted.

In the channel estimating section 105 shown in FIG. 8, an error correcting section 801 provides predetermined error correction processing such as deinterleaving, Viterbi decoding, etc., to the data portion signal subjected to compensation for channel variation and outputs error-corrected data to a comparing section 802. In addition, error correction processing that is performed by the error correcting section 801 is not limited to deinterleaving, Viterbi decoding, etc., and the error correcting section 801 performs error correction processing corresponding to a coding method provided to the data portion signal on the transmitting side.

The comparing section 802 compares the error-corrected data output from the error correcting section 801 with the temporary decision value for each symbol and outputs a signal indicating a comparison result to the switch controlling section 803. In other words, the comparing section 802 outputs a signal which indicates whether error-corrected data matches the temporary decision value to the switch controlling section 803.

The switch controlling section 803 performs connection/disconnection control of SW 804 according to the comparison result. More specifically, when the value of error-corrected data matches the temporary decision value, the switch controlling section 803 connects the data channel estimating section 204 to the combining section 207 by SW 804 and outputs the data channel estimation value to the combining section 207. While, when the value of error-corrected data does not match the temporary decision value, the switch controlling section 803 disconnects the data channel estimating section 204 and the combining section 207 by SW 804 and does not output data channel estimation value to the combining section 207.

The combining section 207 combines the PL channel estimation value together with the data channel estimation value to obtain a final channel estimation value and outputs the final channel estimation value to the multiplier 106.

Next, an operational explanation of the radio receiving apparatus according to this embodiment will be given.

The symbol that is not yet subjected to error correction in which the value matches the value subjected to error correction is a symbol whose value is unchanged by the error correction, so that, the symbol which is not yet subjected to error correction can be considered as a symbol that originally has high reliability. Accordingly, it can be said that the data channel estimation value calculated from the symbol with high reliability also has high reliability. While, the symbol that is not yet subjected to error correction in which the value does not match the value subjected to error correction is a symbol whose value is changed by the error correction, so that, the symbol which is not yet subjected to error correction can be considered as a symbol that originally has low reliability. Accordingly, it can be said that the data channel estimation value calculated from the symbol with low reliability also has low reliability. In this way, by comparing the value which is not yet subjected to error correction with the value which is subjected to error correction, it is possible to decide the level of reliability (level of likelihood) of data portion signal for each symbol.

Here, the comparing section 802 compares the value of error-corrected data output from the error correcting section 801 with the temporary decision value output from the temporary deciding section 203 for each symbol, and outputs a signal to the switch controlling section 803 to indicate whether the value of error-corrected data matches the temporary decision value.

The switch controlling section 803 performs connection/disconnection control of SW 804 according to the signal output from the comparing section 802. That is to say, when the value of error-corrected data matches the temporary decision value, the switch controlling section 803 connects the data channel estimating section 204 to the combining section 207 by SW 804. While, when the value of error-corrected data does not match the temporary decision value, the switch controlling section 803 disconnects the data channel estimating section 204 and the combining section 207 by SW 804. Similar to Embodiment 2, by such operations of the comparing section 802, switch controlling section 803 and SW 804, only data channel estimation value with high reliability obtained from the data portion signal with high reliability is selected among the data channel estimation values calculated on a symbol-by-symbol basis. In other words, among the data channel estimation values calculated on a symbol-by-symbol basis, the data channel estimation values with low reliability are thinned out.

Accordingly, similar to Embodiment 2, in the combining section 207, the data channel estimation values with low reliability are not used to calculate the final channel estimation value for compensating the channel variation in received data. Then, only data channel estimation value with high reliability is combined together with the PL channel estimation value so as to obtain a final channel estimation value. This makes it possible to prevent accuracy of the channel estimation from being deteriorated.

Thus, in the radio receiving apparatus and radio receiving method according to this embodiment, the value which is not yet subjected to error correction is compared with the value which is subjected to error correction. Then, the symbol in which these values are different is decided as a symbol with low reliability, and the channel estimation is performed without using the channel estimation value obtained from the symbol with low reliability. This makes it possible to prevent accuracy of the channel estimation from being deteriorated when the channel estimation is performed using the unknown signal of data portion.

As explained above, according to the present invention, when the channel estimation is performed using the unknown signal of data portion, accuracy of the channel estimation can be prevented from being deteriorated, so that channel estimation with high accuracy can be performed.

This application is based on the Japanese Patent Application No. 2000-225161 filed on Jul. 26, 2000, entire content of which is expressly incorporated by reference herein.

INDUSTRIAL APPLICABILITY

The present invention can be applied to a communication terminal apparatus such as a cellular phone etc., used in a mobile communication system and a base station apparatus that performs radio communication with the communication terminal apparatus. In case of such an application, when the channel estimation is performed using the unknown signal of data portion at the communication terminal apparatus and base station apparatus, it is possible to prevent accuracy of channel estimation from being deteriorated.

What is claimed is:

1. A channel estimation apparatus that performs channel estimation using a received signal, the apparatus comprising:
   an estimator that performs channel estimation using a pilot signal included in the received signal to obtain a first channel estimation value and performs channel estimation using a data signal included in the received signal to obtain a second channel estimation value;
   a calculator that calculates the reliability of a temporary decision value, which is based on the first channel estimation value and the data signal, to produce a weighting coefficient;
   a multiplier that multiplies the second channel estimation value by the weighting coefficient to produce a weighted second channel estimation value; and
   a combiner that combines the weighted second channel estimation value with the first channel estimation value to obtain a third channel estimation value.

2. The channel estimation apparatus according to claim 1, wherein the weighting coefficient becomes larger as the reliability of the temporary decision value becomes higher and becomes smaller as the reliability of the temporary decision value becomes lower.

3. A radio receiving apparatus comprising:
   the channel estimation apparatus according to claim 1;
   a complex multiplier that complex-multiplies the data signal by the third channel estimation value; and
   a demodulator that demodulates the data signal multiplied by the third channel estimation value.

4. A communication terminal apparatus comprising the radio receiving apparatus according to claim 3.

5. A base station apparatus comprising the radio receiving apparatus according to claim 3.

6. A channel estimation method that performs channel estimation using a received signal, the method comprising:
   performing channel estimation using a pilot signal included in the received signal to obtain a first channel estimation value;
   performing channel estimation using a data signal included in the received signal to obtain a second channel estimation value;
   calculating the reliability of a temporary decision value, which is based on the first channel estimation value and the data signal, to produce a weighting coefficient;
   multiplying the second channel estimation value by the weighting coefficient to produce a weighted second channel estimation value; and
   combining the weighted second channel estimation value with the first channel estimation value to obtain a third channel estimation value.

* * * * *